United States Patent [19]
Cartmell et al.

[11] 4,086,398
[45] Apr. 25, 1978

[54] MULTI-COMPARTMENT PHOTOGALVANIC CELL

[75] Inventors: Donald K. Cartmell, Belvidere; Horst Witzke, Princeton, both of N.J.

[73] Assignees: Optel Corporation, Princeton, N.J.; Grumman Aerospace Corporation, Bethpage, N.Y.; part interest to each

[21] Appl. No.: 740,874

[22] Filed: Nov. 11, 1976

[51] Int. Cl.² .................... H01M 6/30; H01M 6/36
[52] U.S. Cl. .................................................. 429/111
[58] Field of Search .............. 429/111; 136/89 NB

[56] References Cited
U.S. PATENT DOCUMENTS

| | | | |
|---|---|---|---|
| 2,921,111 | 1/1960 | Crowley et al. | 429/67 X |
| 3,102,058 | 8/1963 | Jones | 429/119 |
| 3,953,238 | 4/1976 | Honer | 429/119 |

OTHER PUBLICATIONS

R. Gomep, "Photogalvanic Cells," *Electrochimica Acta*, vol. 20, pp. 13-20 (1975).
D. E. Hall et al., "A Multilayer Iron-Thionine Photogalvanic Cell," *J. Electrochem. Soc.*, vol. 123, pp. 1705-1707, Nov. 1976.

*Primary Examiner*—Aaron Weisstuch
*Attorney, Agent, or Firm*—Morris Liss; Israel Gopstein

[57] ABSTRACT

A number of aligned and spaced photogalvanic cells/compartments have interior passages formed therebetween to permit the free passage of electrolyte. Each compartment includes spaced electrodes and a $TiO_2$-electrolyte photoactive site. A layer of charge storing material, such as tungsten oxide may be incorporated in each compartment. As a result, each compartment is capable of converting light energy to electrical energy and also storing charge within the cell after light irradiation ceases. By connecting the various electrodes of the compartments in parallel, greater current flow may be appreciated.

11 Claims, 1 Drawing Figure

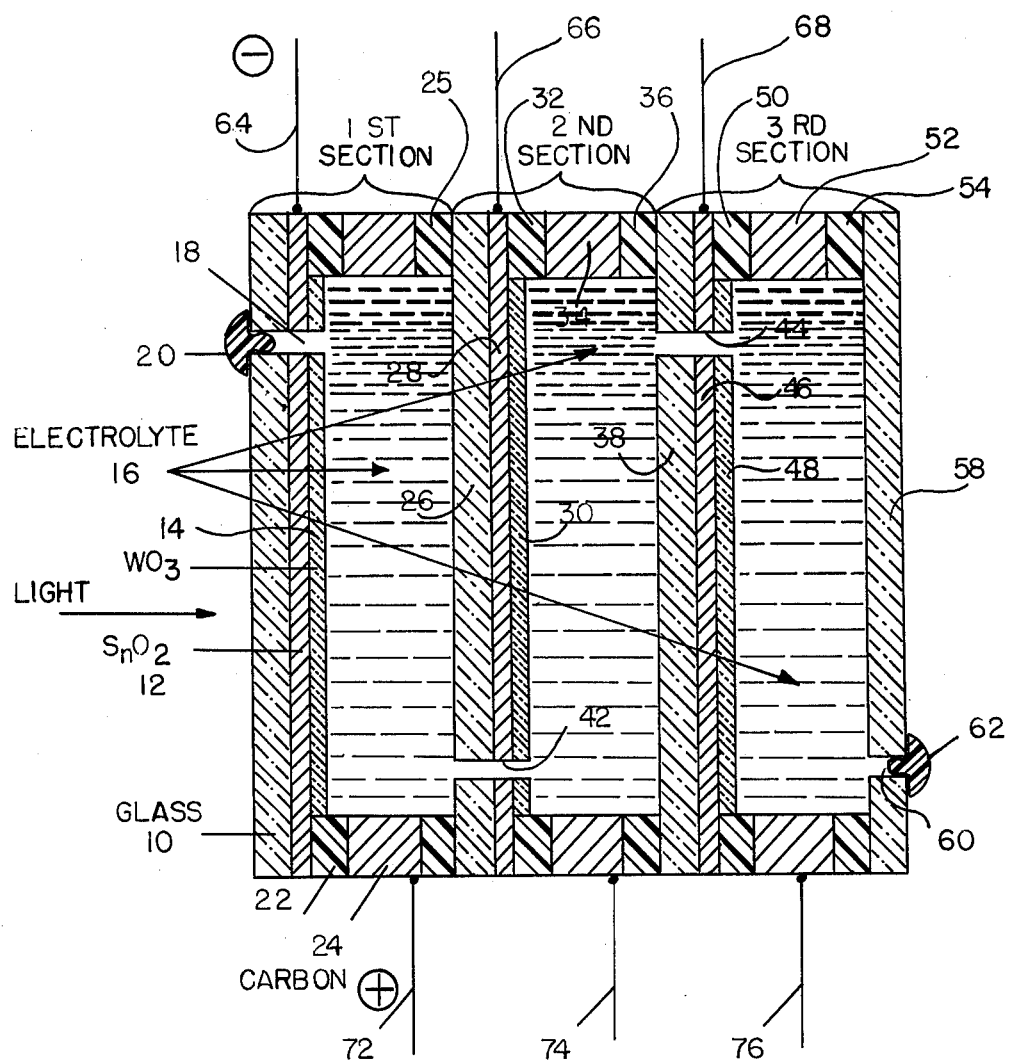

MULTI-COMPARTMENT PHOTOGALVANIC CELL

FIELD OF THE INVENTION

The present invention relates to photogalvanic cells and more particularly to photogalvanic cells having a fluid electrolyte which cooperates with other materials in the cell to achieve conversion of light to electrical energy and also charge storage.

BRIEF DESCRIPTION OF THE PRIOR ART

In copending application Ser. No. 582,344, assigned to a common assignee, a photogalvanic cell having charge storage capability is disclosed. In addition to the conventional transparent film electrode and spaced carbon counterelectrode, the cell disclosed in the referenced application includes an aqueous acid electrolyte incorporating $TiO_2$ material which is primarily responsible for achieving energy conversion from light to electrical forms. In addition, the referenced application discloses the utilization of a charge storage thin film comprising tungsten oxide which is deposited upon the transparent electrode and which contacts the electrolyte. The resultant cell therefore achieves two primary objectives. The first is the conversion of light to electrical energy. Secondly, the cell is capable of storing electrical charge after a source of irradiating light is removed.

This type of cell has limited voltage and current capacities. In order to achieve current capacity, it is necessary to connect a plurality of these single compartment cells in parallel. In order to achieve higher operating voltages, the cells must be connected in series. As will be appreciated, if higher operating voltages or currents are required, the use of several individual cells connected together results in an inherent reliability problem as well as a disadvantageous cost consideration.

BRIEF DESCRIPTION OF THE PRESENT INVENTION

The novelty of the present invention is primarily directed to the repackaging of known photogalvanic cells in a manner achieving a multicompartment configuration wherein internal passages are formed to allow the relatively free flow of electrolyte between the individual compartments. The inventive concept of the present invention need not only apply to the particular structure of the above-mentioned copending application but is reasonably calculated to apply to all photogalvanic cell structures having an electrolyte.

The distinct advantage of the present invention is that within the confines of a single package, a photogalvanic cell may be realized which can be connected in a manner achieving higher current flow than would be available in a single cell and with a greater reliability and cost effectiveness than utilizing a number of independent cells as discussed above. Further, the construction of the present invention has evidenced higher charge storing capacity than would be possible in a single photogalvanic cell of reasonable size. It should be mentioned here that a point of diminishing returns comes quickly when one attempts to build a large single photogalvanic cell. This is due to the increased thicknesses of electrode films, tungsten oxide films and electrolyte thicknesses which increases resistance and decreases electron transport capability thereby interfering with the basic process of a photogalvanic cell.

BRIEF DESCRIPTION OF THE FIGURE

The above-mentioned objects and advantages of the present invention will be more clearly understood when considered in conjunction with the accompanying drawing, in which:

The FIGURE is a diagrammatic representation of the cross-sectional view of the present invention.

DETAILED DESCRIPTION OF THE INVENTION

Referring to the FIGURE, a preferred embodiment of the present invention is illustrated. However, it is to be stressed that the multi-compartment concept of the invention may be applied to other types of photogalvanic cells having a fluid electrolyte. The significance of the invention is to reconstruct the usual single compartment photogalvanic cell of this type into a multicompartment configuration having internal passages to allow the relatively free flow of the electrolyte between the various compartments.

As will be noted, the FIGURE illustrates first, second and third compartment sections but this specific number is merely illustrative and is not considered a restriction.

The first section has a glass substrate 10 upon which a light transparent conductive thin film electrode 12 is deposited. A suitable material is conducting tin oxide. As will be recognized, the combination of the electrode 12 and glass substrate 10 is commercially available in prefabricated form and known in the industry as Nesa glass. A charge storage thin film 14 is deposited upon the conductive thin film 12. The charge storage thin film 14 may be fabricated from a material such as tungsten oxide which primarily achieves charge storage in response to light irradiation of the device so that the cell is capable of driving a load after irradiation ceases. In the case of tungsten oxide, the material also has a small light-electrical energy conversion capability. The electrode 12 and thin film 14 may be deposited by conventional techniques including thermal evaporation, sputtering and chemical vapor deposition. The tungsten oxide layer has a typical thickness of 5,000 Angstroms.

An acidic fluid electrolyte 16 is maintained in contact with the right surface of the tungsten oxide thin film 14. The electrolyte 16 was referred to as a charge compensator layer in the previously mentioned copending patent application. As explained therein, this layer of electrolyte is an aqueous acidic medium including glycerine, sulfuric acid and $TiO_2$ power pigment mixed in non-critical proportions necessary to achieve the desired photoconversion and storage. Typically, the electrolyte layer in each section or compartment of the cell is 1 mm. A first filling hole 18 is formed between the various layers 10, 12 and 14 to allow entry of a needle filled with the electrolyte material. A second filling hole 60 is formed in the right or rearmost glass member 58 which allows escape of displaced air from the interior of the cell as electrolyte is admitted. A suitable plug 20 made from an inert adhesive such as epoxy seals the electrolyte within the cell as does the similar plug 62 located in the second filling hole 60.

A carbon ring 24 circumscribes the first section in the vicinity of the electrolyte. The carbon ring 24 contacts the electrolyte along an interior surface and serves the dual function of acting as a sealing wall for the first section as well as serving as a counterelectrode for the first section. The carbon ring may be fabricated by conventional machining techniques such as milling. In order to properly insulate the carbon ring 24 from the electrode thin film 12, an insulating ring 22 of appropriate inert adhesive, such as epoxy is used. A second insulating ring 25, identical to the first ring 22 attaches an opposite transverse edge of the carbon ring 24 to the glass substrate 26 forming the outer face of the second cell section.

The second section has a thin film electrode 28 which is identical in purpose to that of the previously mentioned electrode 12 in connection with the first section. The combination of glass substrate 26 and electrode 28 may again be Nesa glass. The tungsten oxide thin film 30 corresponds in construction and purpose to the previously mentioned film 14 in connection with the first section. The components of the second section, namely, 32, 34 and 36 correspond with similar components 22, 24 and 25 of the first discussed section. An opening 42 is formed in the components 26, 28 and 30 to allow relatively free passage of the electrolyte 16 between the first and second sections or compartments of the cell.

A third compartment or section is illustrated in the FIGURE and the components of this cell include a laminated structure of layers 38, 46 and 48 which again correspond in structure and purpose to similar layers 10, 12 and 14 of the first section. An opening 44 is formed in the layers 38, 46 and 48 to again permit the free passage of the electrolyte 16 between the aforementioned first and second sections to the third section. The third section also includes the components 50, 52 and 54 which correspond in structure and purpose to the previously mentioned components 22, 24 and 25 of the first section. As in the case of the fully discussed first section, the electrolyte layer in the second and third sections may typically be 1 mm. The rightmost member of the third section is an insulated wall 58 which may be made from glass, plastic or other suitable material.

Leads 64, 66 and 68 are respectively connected to the electrodes 12, 28 and 46. In a similar manner, separate leads 72, 74 and 76 are respectively connected to the counterelectrodes 24, 34 and 52.

In operation of the above device, only the layers 10, 12 and 14 are irradiated by incoming light. As a result, a photovoltage is generated at the electrode and counterelectrode 12 and 24, respectively. The electrodes and counterelectrodes of the second and third sections may also be selectively connected in parallel to the electrode and counterelectrode of the first section while the cell is being irradiated, in which case the tungsten oxide thin film associated with the connected electrodes will also become charged. The sections of the cell may be discharged in parallel or separately, either during the charging process or afterwards by means of a selective switch (not shown). The first section may also exist without the tungsten oxide thin film in which case the main function of the first section will be to generate a photovoltage.

It has been established that the $TiO_2$ powder in the above-described photogalvanic cell is the primary photoactive site and hence the $TiO_2$ may also be in the form of a thin film. However, in the event that the $TiO_2$ exists as a powder suspended in the aqueous electrolyte, the preferred form of $TiO_2$ is anatase although the rutile form is satisfactory. As a further design consideration, the carbon counterelectrode rings 24, 34 and 52 may have a small amount of catalytic material on it such as platinum.

The concept of the multi-compartment cell may also be extended to other systems where certain materials perform the photoconversion while others achieve charge storage. For example, the tungsten oxide film 14 may be replaced by a CdS layer upon which a $TiO_2$ thin film is deposited, in which case no $TiO_2$ would be necessary in the electrolyte mixture. The concept of the multicompartment cell could also be extended to electrolytes incorporating dye systems.

It should be understood that the invention is not limited to the exact details of construction shown and described herein for obvious modifications will occur to persons skilled in the art.

We claim the following:

1. A multi-compartment photogalvanic cell having a plurality of aligned communicating sections, each comprising:
    an electrode;
    a counterelectrode spaced from the electrode;
    an electrolyte means contained between the electrode and counterelectrode for enabling photogalvanic operation of the cell; and
    means formed between the sections for permitting flow of the electrolyte between the sections;
    said cell comprising:
    transparent electrode means in an outermost section for receiving
    light irradiation, and
    conductor means connected to the electrodes and counterelectrodes of each section for connecting said sections in parallel, and for drawing electrical power from the cell in response to irradiation by light received by said transparent electrode means.

2. The subject matter set forth in claim 1 together with material contacting the electrolyte and the electrode in selected sections of the cell for storing electrical charge as light energy is converted to electrical energy, the stored charge being available from the cell after irradiating light is removed.

3. The subject matter set forth in claim 2 wherein the material is tungsten oxide deposited on the electrode as a thin film.

4. The subject matter set forth in claim 3 wherein the electrolyte includes a mixture containing a metal oxide pigment material functioning as a primary photoactive site.

5. The subject matter set forth in claim 4 wherein the metal oxide is $TiO_2$ in the anatase form.

6. The subject matter set forth in claim 4 wherein the metal oxide is $TiO_2$ in the rutile form.

7. The subject matter set forth in claim 1 wherein the electrolyte includes a mixture containing a metal oxide pigment material functioning as a primary photoactive site.

8. The subject matter as set forth in claim 7 wherein the metal oxide is $TiO_2$ in the anatase form.

9. The subject matter set forth in claim 7 wherein the metal oxide is $TiO_2$ in the rutile form.

10. The subject matter set forth in claim 1 wherein each section further includes a thin film of a metal oxide overlying the electrode and functioning as a photoactive site.

11. The subject matter set forth in claim 1 wherein the electrolyte means contains a dye.

* * * * *